(12) United States Patent
Mondragon-Parra et al.

(10) Patent No.: US 11,098,764 B2
(45) Date of Patent: Aug. 24, 2021

(54) UNIVERSAL JOINT OR CONSTANT VELOCITY JOINT TORQUE TRANSMISSION INTERFACE

(71) Applicant: STEERING SOLUTIONS IP HOLDING CORPORATION, Saginaw, MI (US)

(72) Inventors: Eduardo Mondragon-Parra, Freeland, MI (US); Jeffrey P. Courville, Frankenmuth, MI (US); Steven M. Thomas, Saginaw, MI (US); Brian J. Kleinfeld, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 759 days.

(21) Appl. No.: 15/601,191

(22) Filed: May 22, 2017

(65) Prior Publication Data
US 2018/0335092 A1 Nov. 22, 2018

(51) Int. Cl.
*F16D 1/076* (2006.01)
*F16D 3/205* (2006.01)
*F16D 3/223* (2011.01)

(52) U.S. Cl.
CPC .............. *F16D 1/076* (2013.01); *F16D 3/205* (2013.01); *F16D 3/2055* (2013.01); *F16D 3/223* (2013.01); *F16D 2003/22323* (2013.01)

(58) Field of Classification Search
CPC ........ F16D 3/205; F16D 3/2055; F16D 3/223; F16D 2003/22323; F16D 1/076; F16D 1/10; F16D 1/101; F16D 2001/102; F16D 2001/103
See application file for complete search history.

(56) References Cited

U.S. PATENT DOCUMENTS

| 2,235,002 | A |   | 3/1941 | Anderson |
| 4,074,946 | A | * | 2/1978 | Swearingen .......... F04D 29/266 403/364 |
| 4,094,376 | A | * | 6/1978 | Welschof ................ F16D 3/845 180/254 |

(Continued)

FOREIGN PATENT DOCUMENTS

| DE | 3326990 A1 | 2/1985 |
| FR | 3003618 A1 | 9/2014 |

(Continued)

OTHER PUBLICATIONS

European Search Report from the European Patent Office for EP Application No. 18172787.6 dated Sep. 6, 2018, 8 pages.

(Continued)

*Primary Examiner* — Jonathan P Masinick
(74) *Attorney, Agent, or Firm* — Dickinson Wright PLLC

(57) ABSTRACT

A universal or constant velocity joint includes a first rotatable shaft member that extends along a longitudinal axis, a bearing member, and a joining member. The first rotatable shaft member has a free end that defines a shaft face spline. The bearing member includes a bearing hub having a first end, a second end, and a longitudinally extending hub bore. The first end has a hub face spline. The joining member fixes the bearing member to the shaft with the hub face spline and shaft face spline engaged in interlocking engagement.

13 Claims, 10 Drawing Sheets

(56) References Cited

U.S. PATENT DOCUMENTS

| | | | | |
|---|---|---|---|---|
| 8,313,386 | B2* | 11/2012 | Costa | F16D 3/20 |
| | | | | 464/145 |
| 8,714,573 | B2* | 5/2014 | Harada | B60B 27/0026 |
| | | | | 280/124.125 |
| 9,004,215 | B2* | 4/2015 | Hofmann | B60B 27/065 |
| | | | | 180/261 |
| 9,115,764 | B2* | 8/2015 | Mizuno | F16D 3/2055 |
| 9,308,775 | B2* | 4/2016 | Matsunaga | F16C 43/04 |
| 9,334,904 | B2* | 5/2016 | Ishikura | F16D 3/387 |
| 9,630,237 | B2* | 4/2017 | Kimura | B21J 9/025 |
| 9,951,822 | B2* | 4/2018 | Tsujimoto | F16D 3/2055 |
| 10,174,793 | B2* | 1/2019 | Thomas | F16D 3/2055 |
| 10,207,536 | B2* | 2/2019 | Song | B60B 35/18 |
| 2009/0011843 | A1* | 1/2009 | Oh | F16D 3/2055 |
| | | | | 464/147 |
| 2009/0197687 | A1* | 8/2009 | Ando | F16D 3/205 |
| | | | | 464/111 |
| 2009/0305793 | A1* | 12/2009 | Bongartz | F16D 3/2055 |
| | | | | 464/11 |
| 2010/0088874 | A1* | 4/2010 | Stanik | F16D 3/223 |
| | | | | 29/428 |
| 2011/0053695 | A1* | 3/2011 | Yun | F16D 3/2055 |
| | | | | 464/11 |
| 2011/0123264 | A1* | 5/2011 | Wang | F16D 1/033 |
| | | | | 403/359.6 |
| 2013/0053155 | A1* | 2/2013 | Watanabe | B60B 27/0031 |
| | | | | 464/157 |
| 2015/0132052 | A1* | 5/2015 | Hofmann | F16D 1/076 |
| | | | | 403/364 |
| 2015/0198206 | A1* | 7/2015 | Thomas | F16D 3/2055 |
| | | | | 464/124 |
| 2017/0082150 | A1* | 3/2017 | Uhrick | F16D 1/076 |
| 2017/0130776 | A1* | 5/2017 | Uhrick | F16C 3/02 |

FOREIGN PATENT DOCUMENTS

| | | |
|---|---|---|
| GB | 20696 A | 3/1912 |
| JP | 2015214995 A | 12/2015 |

OTHER PUBLICATIONS

"Hirth joint" from Wikipedia, the free encyclopeida; printed on Feb. 21, 2017, 3 pages; https://en.wikipedia.org/wiki/Hirth_joint.

* cited by examiner

UNIVERSAL JOINT OR CONSTANT VELOCITY JOINT TORQUE TRANSMISSION INTERFACE

BACKGROUND

The present disclosure relates to a universal joint or constant velocity joint torque transmission interface or joint, and more particularly to universal joint or constant velocity joint lash-free torque transmission interface, and even more particularly to a to universal joint or constant velocity joint face spline interface or joint.

Mating axially-extending radial splines or serrations are one of the most common interfaces for forming a joint between or coupling coaxial shaft members of universal joints or constant velocity joints whose main purpose is to transmit torque and rotary motion. Mating axially-extending radially spaced splines or serrations coupling an outer diameter of one shaft or joint member with an inner diameter of another shaft or joint member have been widely used in many industries. These interfaces or joints provide a compact connection that can be mass produced at relatively low cost. For example, internal splines can be manufactured through a broaching process while external splines can be rack-rolled.

Mating radial spaced splines or serrations have a disadvantage when it comes to fit. Because of variation inherent to their manufacturing processes a radial spline will generally have either a press fit or slide fit. Transitional fits, where at the initiation of engagement the mating members are in a non-interference condition (i.e. slide fit) and transition to an interference condition (i.e. press fit) as they are slid together and their engagement progresses, are difficult to achieve and control in large production volumes.

A press fit frequently may require having a hydraulic press to assemble the joint members. The addition of a press fit operation may pose limitations which include: an additional increment in cycle time to build an assembly; additional capital investment for a press; sophisticated control equipment or methods to press to a predetermined distance, or load, or a combination of both. Notwithstanding these limitations, a press fit joint is desired because of the elimination of lash, or the clearance or play between the engaged mating splines, because lash creates the possibility of undesired movement between adjacent movable or rotatable mechanical parts in the assembly.

A slide fit has the advantages of not requiring special equipment for assembly. However, a slide fit will necessarily result in lash at the spline connection. If the amount of lash becomes excessive, it may result in undesired noise, vibration, or harshness (NVH) characteristics in the resulting universal joint or constant velocity joint application, such as, for example, in a vehicle, particularly in the steering or driveline systems.

Regardless of whether mating radially spaced splines or serrations have a press fit or a sliding fit, a third component is generally required as part of the interface or joint to guarantee the assembly will stay together during operation. This third component is commonly a retaining ring, to limit relative axial motion between the mated radially spaced splines or serrations.

Accordingly, a universal joint or constant velocity joint that includes a no-lash interface or joint to couple the adjoining shaft or joint members and is configured to transmit torque and enable rotatory motion while avoiding the limitations of the prior art, particularly the formation of a press fit between the axially-extending, radially-spaced spline members, as well as the equipment and methods needed to provide such a press fit, is very desirable.

SUMMARY

A universal or constant velocity joint that includes a torque transmission interface is disclosed. The joint includes a first rotatable shaft member that extends along a longitudinal axis, a bearing member, and a joining member. The first rotatable shaft member has a free end and a shaft bore that longitudinally extends through the first rotatable shaft member. The free end defines a shaft face spline. The bearing member includes a bearing hub having a first end, a second end, and a longitudinally extending hub bore extending between the first end and second end. The first end has a hub face spline. The joining member extends from the second end of the bearing hub through the hub bore into the shaft bore, fixing the bearing member to the shaft with the hub face spline and shaft face spline engaged in interlocking engagement.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to FIGS. 1-6C, where the present disclosure will be described with reference to specific embodiments, without limiting same, various embodiments of a universal joint for transmitting rotary power or torque between two angled shafts is shown generally at 1. In at least one embodiment, the universal joint 1 may also include a constant velocity joint 2 for transmitting rotary power or torque through a variable angle, at constant rotational speed.

Figure 1:
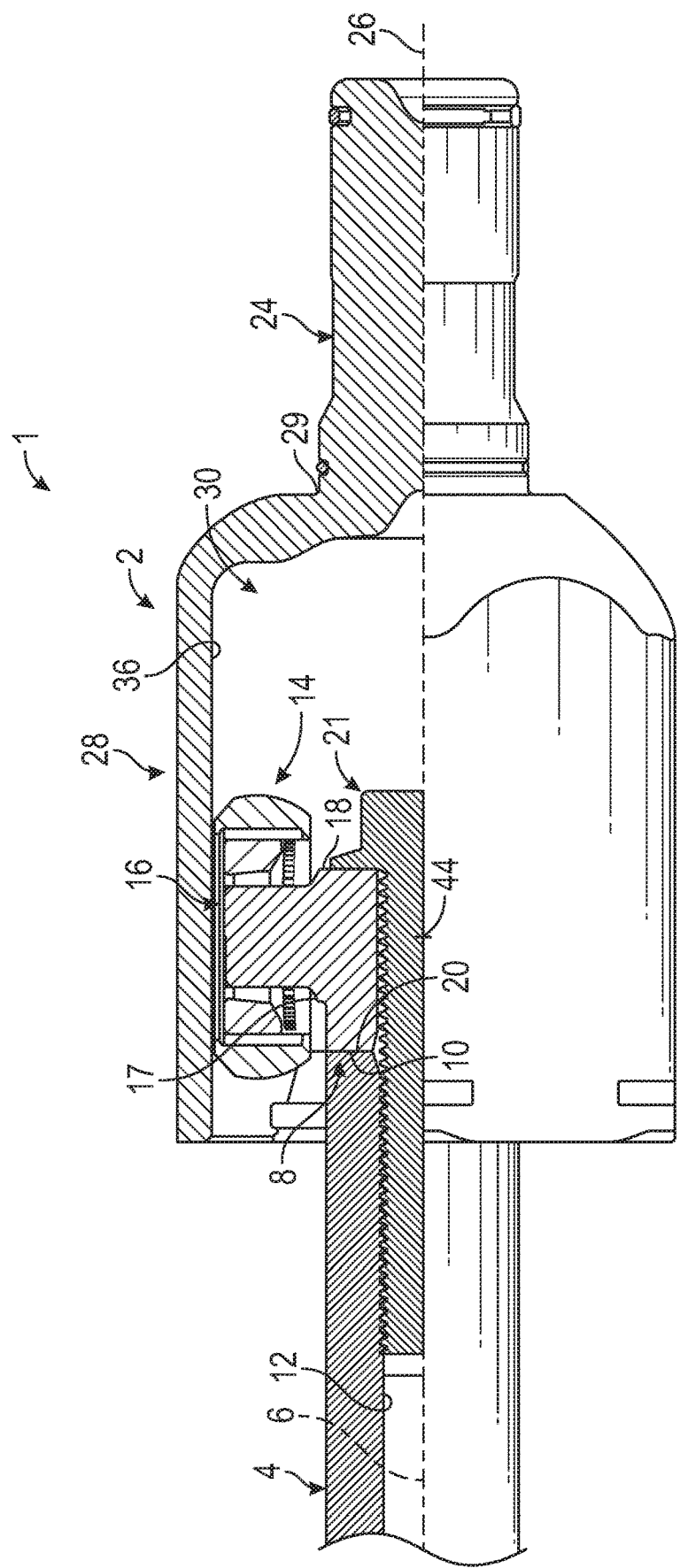
FIG. 1 is a partial cross-sectional view of a universal joint or constant velocity joint.

Referring to FIG. 1, the universal joint 1 or constant velocity joint 2 includes an axle or longitudinally extending shaft or first rotatable shaft member 4 extending along a first longitudinal axis 6 and a shaft free end 8. The shaft free end 8 includes a shaft face spline 10 disposed on the shaft free end 8. The first rotatable shaft member 4 has a longitudinally extending shaft bore 12 extending inwardly from the shaft free end 8. The shaft bore 12 is a threaded shaft bore.

The universal joint 1 or constant velocity joint 2 also includes a bearing member 14 that includes a bearing hub 16, which in one embodiment comprises a cylindrical bearing hub. The bearing hub 16 includes a first end 17, a second end 18, and a longitudinally extending hub bore 19 extending between the first end 17 and second end 18. The universal joint 1 or constant velocity joint 2 also includes a hub face spline 20 disposed on the first end 17 of the bearing hub 16.

A joining member 21 extends from the second end 18 of the bearing hub 16 through the hub bore 19 into the shaft bore 12. The joining member 21 fixes the bearing member 14 to the first rotatable shaft member 4 with the hub face spline 20 and shaft face spline 10 engaged in interlocking engagement. For example, the joining member 21 is a threaded bolt that is threaded into the threaded shaft bore to create a selectively attachable and detachable connection of the bearing member 14 to the first rotatable shaft member 4.

Figure 2:
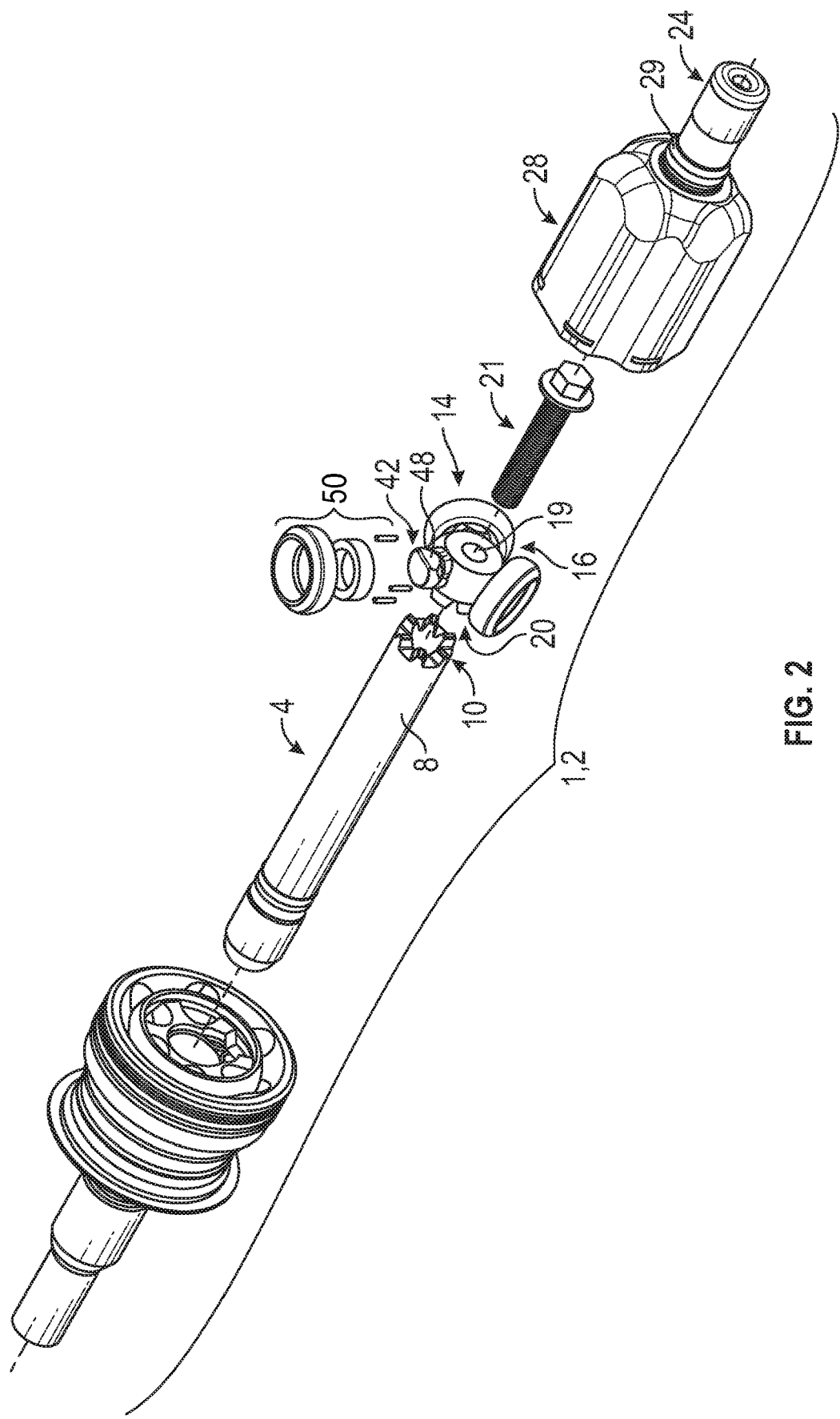
FIG. 2 is a disassembled view of the universal joint or constant velocity joint of FIG. 1.

In the embodiments of FIGS. 1 and 2, the universal joint 1 is a telescoping constant velocity joint 2 that may be used in many applications that require a rotary joint that provides both angulation and axial extension. The constant velocity joint 2 transmits a torque between the first rotatable shaft member 4 and a second rotatable shaft member 24 or axle at various rotational speeds, joint angles and telescopic positions.

The second rotatable shaft member 24 extends along and is rotatable about a second longitudinal axis 26. The second longitudinal axis 26 coincides or is collinear with the first longitudinal axis 6 when the constant velocity joint 2 is at a joint angle of 0 degrees. As will be appreciated by one of ordinary skill, the first longitudinal axis 6 and the second longitudinal axis 26 intersect when the constant velocity joint 2 is articulated or bent at an angle, i.e., when the first rotatable shaft member 4 and the second rotatable shaft member 24 are articulated relative to each other.

The second rotatable shaft member 24 includes a housing 28 at a joint end 29. The housing 28 arranged to slidably receive the bearing hub 16 and at least partially receive the first rotatable shaft member 4 such that the shaft face spline 10 and the hub face spline 20 are disposed within the housing 28.

The housing 28 defines a plurality of circumferentially spaced, longitudinally or axially extending ball tracks, guide grooves or guide channels 30 extending along and parallel with the second longitudinal axis 26 of the second rotatable shaft member 24. The guide channels 30 extend from an open end of the housing 28 towards a closed end of the housing 28.

Figure 3:
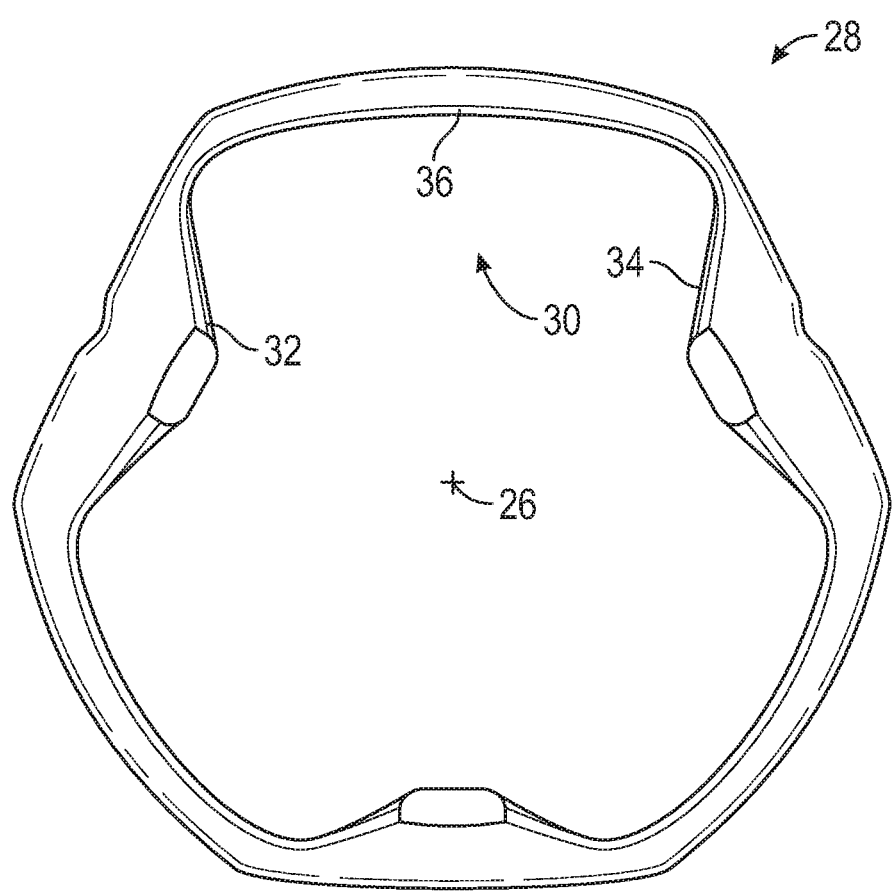
FIG. 3 is an end view of a housing of the universal joint or constant velocity joint.
Figure 4:
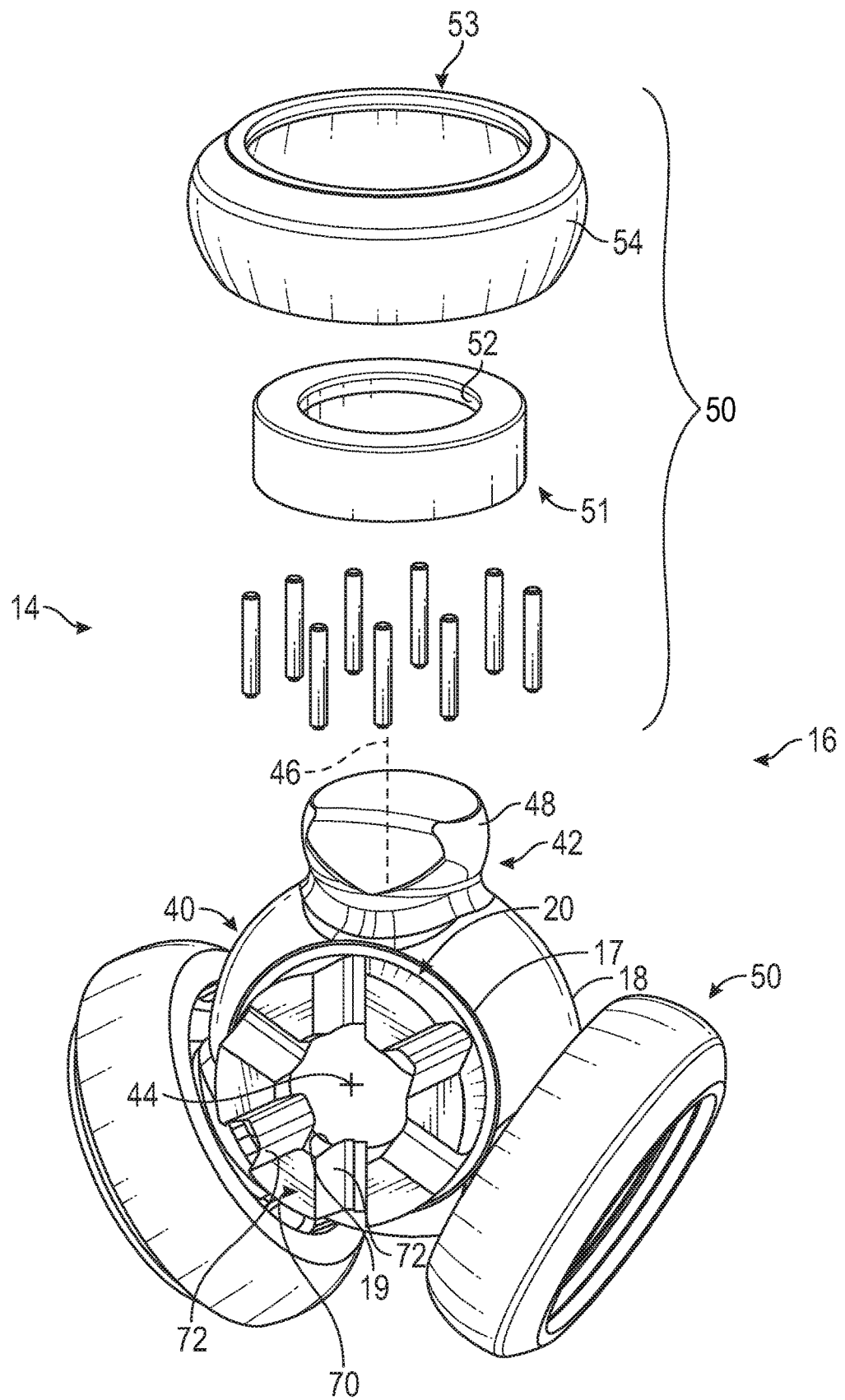
FIG. 4 is a partial disassembled view of a bearing member of the universal joint or constant velocity joint.

In an exemplary embodiment as illustrated in FIG. 3, the housing 28 defines three guide channels 30. The guide channels 30 are equally spaced radially about the second longitudinal axis 26. As shown, the three guide channels 30 are radially spaced about the second longitudinal axis 26 at 120 degree intervals from each other. However, it should be appreciated that the number of guide channels 30 within the housing 28 may vary from the three guide channels 30 shown.

Each guide channel 30 includes a first side surface 32 and an opposing second side surface 34. The first side surface 32 and the second side surface 34 are separated circumferentially about the second longitudinal axis 26 by a back surface 36. The back surface 36 faces radially inward toward the second longitudinal axis 26. The first side surface 32 and the second side surface 34 each include a concave shape opposing the other of the first side surface 32 and the second side surface 34. In an exemplary embodiment, the opposing concave surfaces may comprise surfaces defined by opposing elliptical arcs that extend axially along guide channels 30.

As shown in FIGS. 1, 4 and 6A-6C, the bearing member 14 that includes the bearing hub 16 having the hub face spline 20 meshingly engages the shaft face spline 10 of the shaft free end of the longitudinally extending first rotatable shaft member 4. The bearing hub 16 may be a spider 40 that is disposed at the shaft free end 8 of the first rotatable shaft member 4.

The spider 40 includes a hub bore 19, as illustrated in FIGS. 4 and 6A-6C, that receives the joining member 21 to attach the spider 40 to the first rotatable shaft member 4. The spider 40 is disposed within and moves relative to the housing 28 of the second rotatable shaft member 24.

The spider 40 includes a plurality of trunnions 42 extending radially outwardly from the first longitudinal axis 6, such that the spider 40 is a tripot spider. In the exemplary embodiment of FIGS. 2, 4, and 6A-6C, the spider 40 includes three trunnions 42, but any suitable number of trunnions may be used, including three or more trunnions. It will be appreciated that the number of trunnions 42 corresponds with the number of guide channels 30 within the housing 28. As shown, the three trunnions are equally radially spaced about the first longitudinal axis 6 at 120 degree intervals apart from one another, and are coplanar along a plane that is perpendicular to the first longitudinal axis 6 at the spider center 44. Each of the trunnions 42 extends outwardly from the spider center 44 along a trunnion axis 46, and each trunnion 42 includes a trunnion outer surface 48. The trunnion outer surface 48 has a convex shape that is concentric with the trunnion axis 46. In one embodiment, the convex trunnion outer surface 48 has the shape of a truncated toroid, and may be described by a radial arc or radius of curvature that is rotated about a centroid.

A spider center 44 is disposed along the second longitudinal axis 26 when the constant velocity joint 2 is at a zero joint angle (FIG. 1) and is radially displaced and orbits about the second longitudinal axis 26 when the constant velocity joint 2 is articulated to a non-zero joint angle.

A plurality of rollers 50 are each rotatably supported on a respective trunnion 42. Accordingly, the spider 40 of constant velocity joint 2 shown includes three rollers 50, with one roller 50 rotatably disposed on the convex trunnion outer surface 48 of each of the three trunnions 42. However, it should be appreciated that the number of rollers 50 corresponds with the number of trunnions 42 and the number of guide channels 30. Each of the rollers 50 is disposed within and in moveable engagement with one of the guide channels 30 of the housing 28. The moveable engagement may include both rolling engagement and sliding engagement, and both types of engagement may be experienced as the rollers 50 move within the guide channels 30.

The rollers 50 include an inner element 51 having a radially inner surface 52 disposed against and abutting the convex trunnion outer surface 48 of the trunnions 42. The radially inner surface 52 of the inner element 51 may have a cylindrical shape (FIG. 4) that is concentric with the trunnion axis 46, including a right cylindrical shape, or a concave shape, or a truncated ellipsoid shape, concentric with the trunnion axis 46. If the radially inner surfaces 52 of the inner element 51 include the truncated ellipsoid shape, then the curvature of the truncated ellipsoid shape is less than the curvature of the convex trunnion outer surface 48 by an amount sufficient to ensure that the convex trunnion outer surface 48 of trunnion 42 nests within the inner surface 52 of roller 50 and permits the roller to roll on the trunnion 42.

In certain embodiments, for example the embodiments, the curvature of inner surface 52 is less than the curvature of the convex trunnion outer surface 48 and there is a single point of contact between the trunnions 42 and the inner surface 52 of the rollers 50. This configuration advantageously reduces rolling friction or sliding friction, or both between trunnions 42 and the rollers 50. Alternatively, it should be appreciated that the geometric shape of the radially inner surface 52 of the inner element 51 of the rollers 50 and the trunnion outer surface 48 may differ from that shown and described herein to achieve a two point contact or a three point contact between the trunnions 42 and the rollers 50 as is known in the art.

The rollers 50 further include an outer element 53 having a radially outer surface 54 disposed within the concave first side surface 32 and the concave second side surface 34 of a guide channel 30. In an exemplary embodiment, rollers 50 and guide channels 30 may be sized such that radially outer surface 54 of the outer element 53 is disposed against and abuts the concave first side surface 32 and the concave second side surface 34. The radially outer surface 54 includes a convex shape having a curvature that is greater than the curvature of concave first side surface 32 and second side surface 34, thereby providing a single point of contact between the radially outer surface 54 of the roller 50 and the first side surface 32 and the second side surface 34.

Alternatively, it should be appreciated that the geometric shape of the radially outer surface 54 of the outer element 53 and the first and second side surfaces 32, 34 may differ from that shown and described herein to achieve a two point contact or a three point contact between the radially outer surface 54 and the first side surface 32 and second side surface 34. In an exemplary embodiment, where first side surface 32 and second side surface 34 have an elliptical shape as described herein, outer surface 54 may have a convex shape that includes a truncated ellipsoid shape. Further, the curvature of the ellipsoid comprising outer surface 54 may have a curvature that is greater than the curvature of the elliptical arc comprising concave first side surface 32 and second side surface 34.

As the first rotatable shaft member 4 and the second rotatable shaft member 24 articulate and/or telescope relative to each other, the rollers 50 roll along the guide channels 30 of the housing 28. Additionally, as the rollers 50 roll along the guide channels 30 of the housing 28, the rollers 50 tilt and rotate about the trunnions 42. The rollers 50 are also free to slide on the trunnions 42 axially along the trunnion axis 46, away from and inward toward the spider center 44, as the first rotatable shaft member 4 and the second rotatable shaft member 24 articulate and/or telescope relative to each other.

As shown in FIGS. 2, 4, 5, and 6A-6C, the shaft face spline 10 of the first rotatable shaft member 4 and the hub face spline 20 of the bearing hub 16 each include a respective plurality of circumferentially spaced, longitudinally protruding shaft teeth 60 and hub teeth 70. The shaft teeth 60 of the first rotatable shaft member 4 and the hub teeth 70 of the bearing hub 16 are configured for interlocking interference or abutting engagement with respective ones of the other. In other words, each shaft tooth of the shaft teeth 60 is configured for interlocking interference or abutting engagement with at least one adjoining hub tooth 70, and generally two adjoining hub teeth 70, disposed on radially opposing sides of the shaft tooth, and vice versa.

Referring to FIGS. 5 and 6A-6C, by interlocking interference, it is meant that as the outer surface of at least one shaft tooth of the shaft teeth 60 is engaged inwardly toward the hub 16 into a hub slot 74 (i.e. the space between adjoining hub teeth 70) defined between adjacent hub teeth 70 that the shaft tooth flanks 62 of the shaft tooth and the adjacent or proximate hub tooth flanks 72 of the adjoining hub teeth 70 that all or portions of adjacent shaft tooth flanks 62 and hub tooth flanks 72 come into touching contact with one another in an interference condition, such that there is no space or no-lash, sometimes referred to as backlash, between them to create a no-lash joint.

Similarly, from another perspective, as the outer portion 80 of a hub tooth 70 is engaged inwardly toward the first rotatable shaft member 4 into the hub slot 74 between adjoining shaft teeth 60 that the hub tooth flanks 72 of the hub tooth and the adjacent or proximate shaft tooth flanks 62 of the adjoining shaft teeth 60 that all or portions of adjacent shaft tooth flanks 62 and hub tooth flanks 72 come into contact with one another in an interference condition, such that there is no space or no-lash, between them. The interference condition generally results in deformation of either or both of the interfering shaft teeth 60 and hub teeth 70. In certain embodiments, the deformation includes elastic deformation, and certain other embodiments, the deformation may include both elastic and plastic deformation.

In at least one embodiment, the shaft teeth 60 and hub teeth 70 are configured for interlocking interference and/or abutting engagement with respective ones of the other. In other words, some of the plurality of shaft teeth 60 and hub teeth 70 are configured for interlocking interference engagement and others of the plurality of shaft teeth 60 and hub teeth 70 are configured for abutting engagement.

Figure 5:
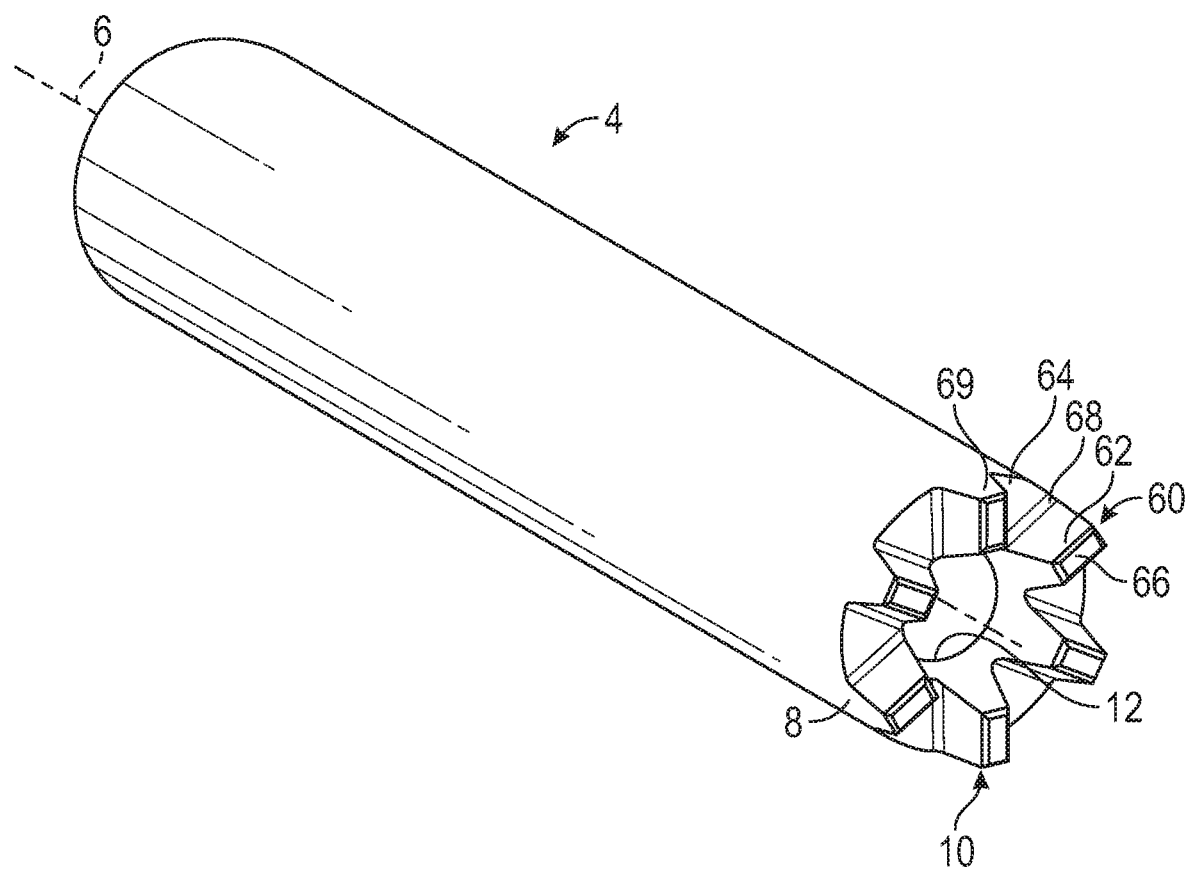
FIG. 5 is a perspective view of a first rotatable shaft member of the universal joint or constant velocity joint.
Figure 6C:
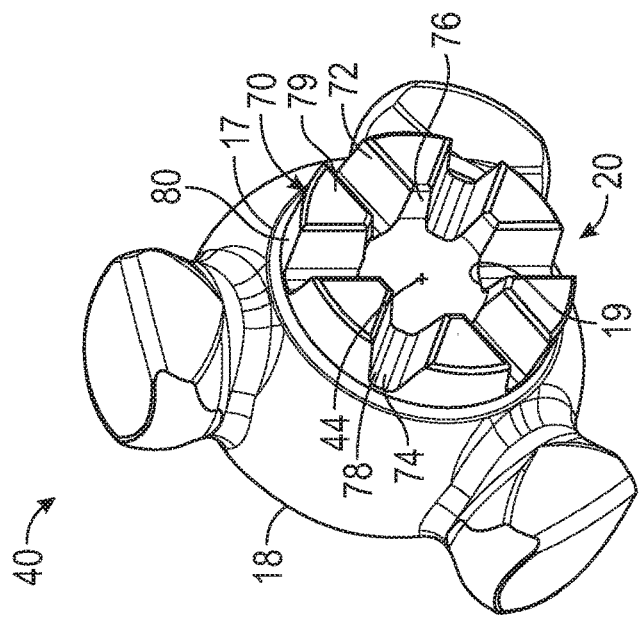
FIGS. 6A-6C are perspective views of a bearing hub of the universal joint or constant velocity joint.
Figure 6B:
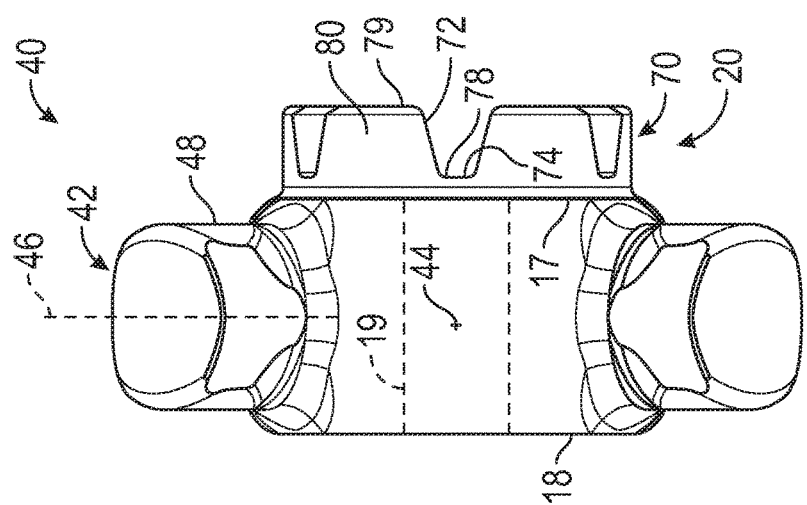
Figure 6A:
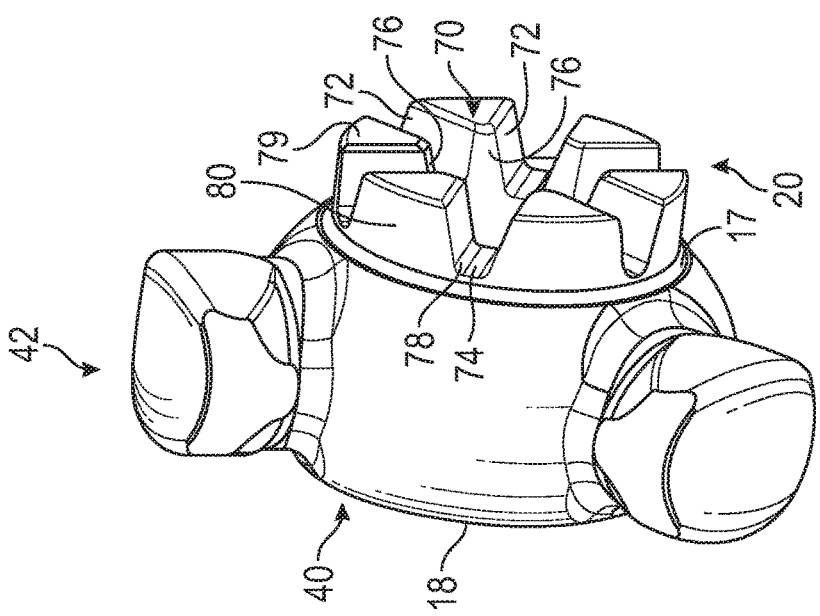

As shown in FIG. 5, the plurality of shaft teeth 60 have a corresponding plurality of opposing shaft tooth flanks 62, a shaft slot 64 (i.e. the space between adjoining shaft teeth 60) defined between adjacent teeth of the plurality of shaft teeth 60, shaft tooth tips 66 at the apex of the shaft tooth, and shaft tooth roots 68 adjacent to the shaft slots 64. At least one of the shaft tooth flank of each shaft tooth of the plurality of shaft teeth 60 tapers towards the other shaft tooth flank of the shaft tooth of the plurality of shaft teeth 60 in a direction that extends from the shaft tooth root 68 towards the shaft tooth tip 66, such that the opposing shaft tooth flanks become progressively closer to each other in a direction that extends from the shaft tooth root 68 towards the shaft tooth tip 66.

Wherein the direction is disposed substantially parallel to the first longitudinal axis 6 and the second longitudinal axis 26. In at least one embodiment, the shaft tooth tip 66 engages the hub slot 74.

Hybrid shaft tooth forms are also possible, including those that include at least one shaft tooth of the plurality of shaft teeth 60 having an outer portion 69 that tapers inwardly toward the first longitudinal axis 6 in a direction that extends from the shaft tooth root 68 toward the shaft tooth tip 66. The shaft tooth flanks 62 may be planar or curved, including either convex or concave curvature, either from root to tip, or from the outer surface of the shaft toward the first longitudinal axis 6, or both. In at least one embodiment, the shaft tooth tips 66 and/or the shaft tooth roots 68 comprises a curved or flat planar surface.

Similarly, the plurality of hub teeth 70 have a corresponding plurality of opposing hub tooth flanks 72, hub tooth tips 76 being a surface disposed closest to the spider center 44, hub tooth roots 78 at the bottom of the hub slots 74, and hub tooth tops 79. At least one of the hub tooth flanks 72 of each hub tooth tapers toward the other tooth flank in a direction that extends towards the hub tooth tip 76, such that the opposing hub tooth flanks 72 become progressively closer to each other in a direction that extends from an outer portion 80 of the hub tooth 70 towards the hub tooth tip 76 or become progressively closer to each other in a direction that extends towards the first longitudinal axis 6 and the second longitudinal axis 26.

Wherein the direction that extends from the outer portion 80 of the hub tooth 70 towards the hub tooth tip 76 is disposed substantially transverse to the direction that extends from the shaft tooth root 68 towards the shaft tooth tip 66 and is disposed substantially transverse or perpendicular to the first longitudinal axis 6 and the second longitudinal axis 26. The tapering of the opposing hub tooth flanks 72 provides the hub teeth 70 and a hub tooth top 79 that extends between the opposing hub tooth flanks 72, hub tooth tip 76, and the outer portion 80 with a substantially wedge shape, involute shape, or pie shape. The hub tooth tops 79 faces towards the shaft face spline 10 and engages the shaft slots 64.

Hybrid hub tooth forms are also possible, including those that include at least one hub tooth 70 having an outer portion 80 that tapers inwardly toward the hub tooth tip 76. The hub tooth tip 76 extends substantially parallel to the spider center 44. The hub tooth flanks 72 may be planar or curved, including either convex or concave curvature, either from root to tip, or from the outer surface of the hub toward the second longitudinal axis 26, or both. In at least one embodiment, the hub tooth tips 76 and/or the hub tooth roots 78 comprises a curved or flat planar surface. The adjoining shaft tooth flanks 62 and hub tooth flanks 72 will be configured to provide the interlocking interference and/or abutting engagement described herein.

The shaft teeth 60 may have any suitable height from shaft tooth root 68 to shaft tooth tip 66. The hub teeth 70 may have any suitable height from hub tooth root 78 to hub tooth top 79 and/or from the outer portion 80 to the hub tooth tip 76. In one embodiment, the protruding shaft teeth 60 and/or the hub teeth 70 have a height of 1 mm to 20 mm. In another embodiment the protruding shaft teeth 60 and/or the hub teeth 70 have a height of 4 mm to 20 mm. In yet another embodiment, the protruding shaft teeth 60 and/or the hub teeth 70 have a height of 4 mm to 16 mm. Any suitable number of shaft teeth 60 and hub teeth 70 may be employed. In one embodiment, the number of shaft teeth 60 and the number of hub teeth 70 is the same, and ranges from 2-80 teeth, and in another embodiment, 4-60 teeth, and in yet another embodiment, 6-40 teeth.

All or portions of the adjacent shaft tooth flanks 62 of shaft teeth 60 and hub tooth flanks 72 of the hub teeth 70 come into, and remain in, touching contact with one another in an abutting condition due to the joining member 21. The joining member 21 preloads the hub face spline 20 against the shaft face spline 10 such that the joining member 21 delashes or eliminates any potential lash or space between the shaft teeth 60 and the hub teeth 70, with substantially no deformation of adjacent teeth, including configurations where there is abutting contact and no deformation of adjacent teeth. Furthermore, when torque is transmitted through the first rotatable shaft member 4 and/or the second rotatable shaft member 24 of the universal joint 1 or constant velocity joint 2, the joining member 21 inhibits the first rotatable shaft member 4 from axially separating from the second rotatable shaft member 24 due to an axial component of the torque.

Figure 7:
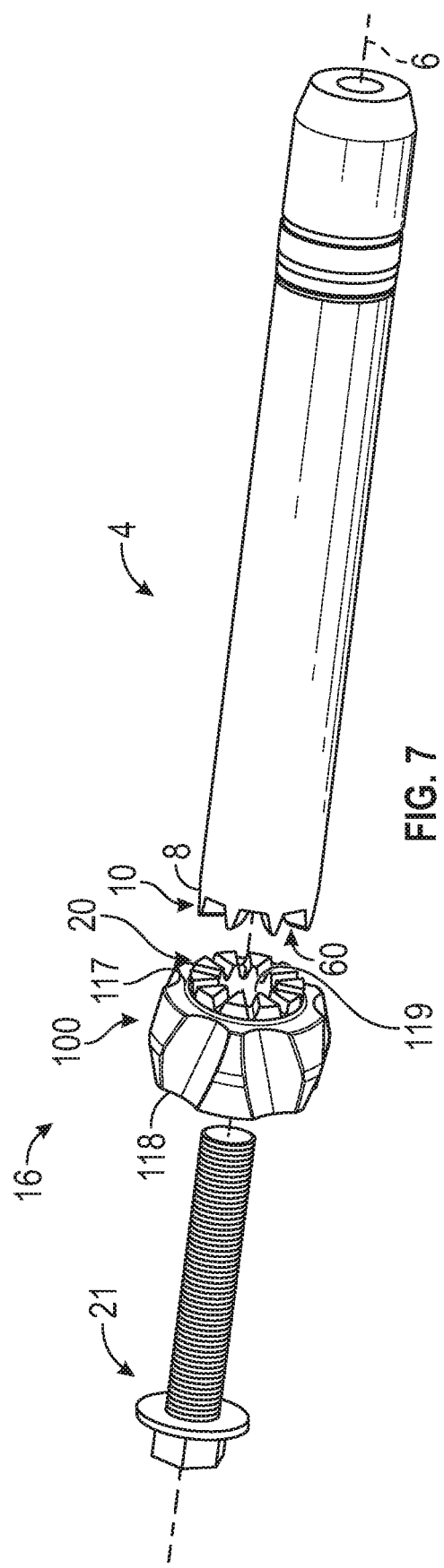
FIG. 7 is a disassembled view of a portion of the universal joint or constant velocity joint.
Figure 8:
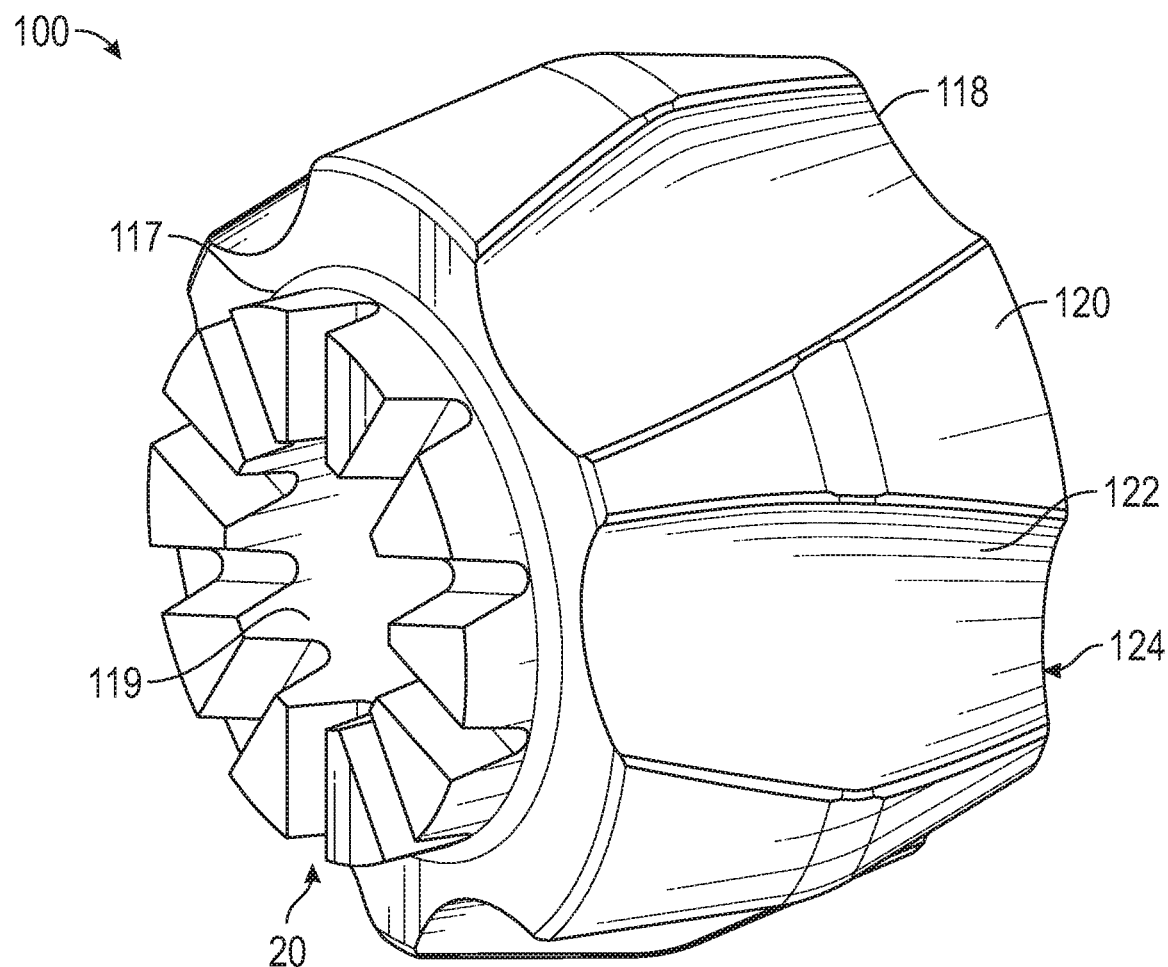
FIG. 8 is a perspective views of a bearing hub of the universal joint or constant velocity joint.

Referring to FIGS. 7-8, the universal joint 1 or the constant velocity joint 2 is configured as an axially telescoping ball joint. In such a configuration, the bearing hub 16 may be an inner race 100 that is received within an outer race that is operatively connected to the second rotatable shaft member 24.

The inner race 100 includes a first end 117, a second end 118, a longitudinally extending hub bore 119 extending through an inner race body 120 between the first end 117 and second end 118. The inner race body 120 extends between the first end 117 and the second end 118. The hub face spline 20 may be defined by or extend from the first end 117. The hub face spline 20 interlockingly engages the shaft face spline 10 that may be defined by or extend from the shaft free end 8 of the first rotatable shaft member 4.

The inner race body 120 of the inner race 100 of the bearing hub 16 includes an outer surface 122 that defines a plurality of circumferentially spaced, longitudinally extending ball tracks or grooves 124. The plurality of circumferentially spaced, longitudinally extending ball tracks or grooves 124 extend from the first end 117 towards the second end 118. The plurality of circumferentially spaced, longitudinally extending ball tracks or grooves 124 are proximately aligned with a plurality of circumferentially spaced, longitudinally extending ball tracks or grooves defined by an inner surface of the outer race The joining member 21 extends from the second end 118 of the inner race 100 of the bearing hub 16 through the hub bore 119 along the first longitudinal axis 6 into the shaft bore 12 of the first rotatable shaft member 4. The joining member 21 fixes the inner race 100 of the bearing hub 16 to the first rotatable shaft member 4 with the hub face spline 20 and shaft face spline 10 engaged in interlocking engagement, as previously described.

Figure 9:
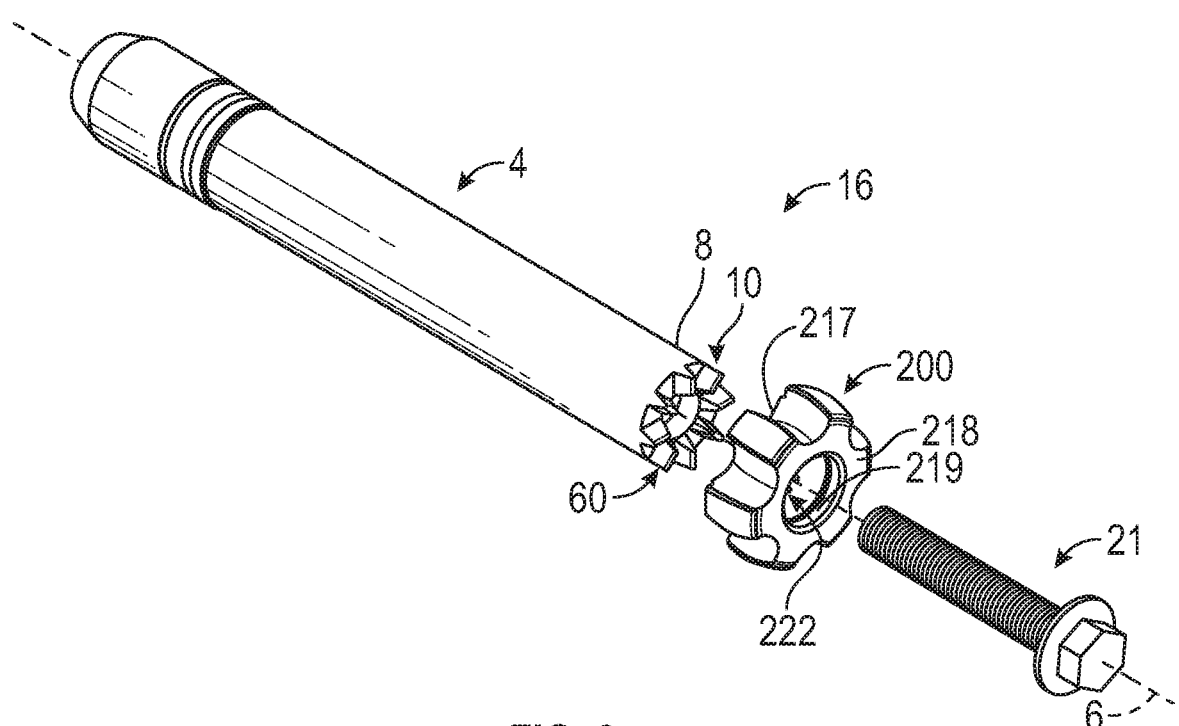
FIG. 9 is a disassembled view of a portion of the universal joint or constant velocity joint.
Figure 10:
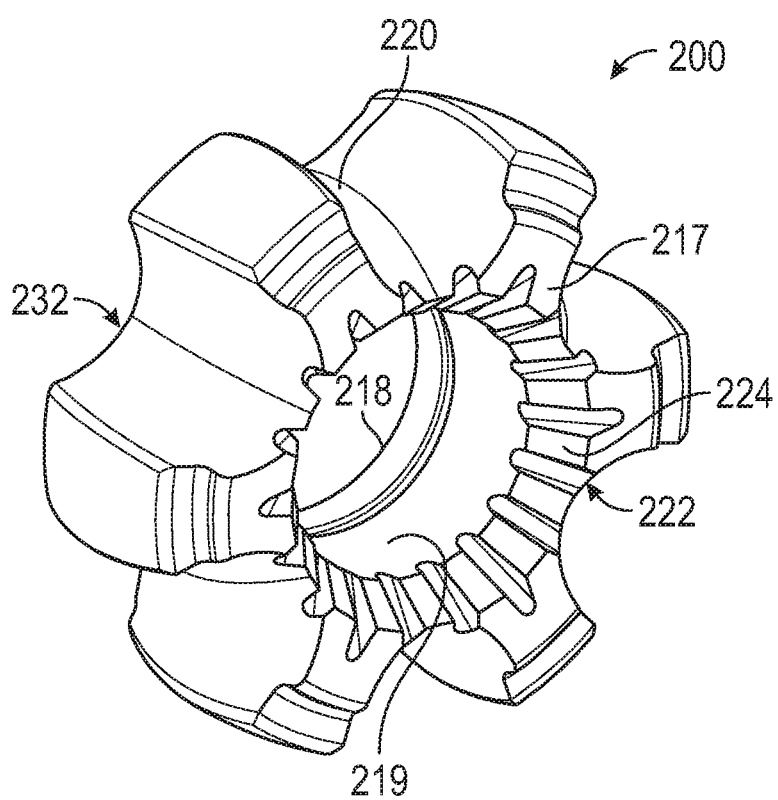
FIG. 10 is a perspective views of a bearing hub of the universal joint or constant velocity joint.

Referring to FIGS. 9 and 10, the universal joint 1 or the constant velocity joint 2 is configured as a fixed center ball joint. In such a configuration, the bearing hub 16 may be an inner race 200 that is received within an outer race that is operatively connected to the second rotatable shaft member 24.

The inner race 200 includes a first end 217, a second end 218, a longitudinally extending hub bore 219 extending through an inner race body 220 between the first end 217 and second end 218. The inner race body 220 extends between the first end 217 and the second end 218. The first end 217 at least partially defines a hub face spline 222 that interlockingly engages the shaft face spline 10 defined by the shaft free end 8 of the first rotatable shaft member 4.

The hub face spline 222 extends between the first end 217 and the hub bore 219, such that the first end 217 and the hub bore 219 define the hub face spline 222. The hub face spline 222 is angled relative to or is declined towards the first longitudinal axis 6 and the second longitudinal axis 26 in a direction that extends from the first end 217 towards the second end 218. The hub face spline 222 may be angled such that the hub face spline is disposed in a substantially non-parallel and non-perpendicular relationship with the first longitudinal axis 6 and the second longitudinal axis 26. The hub face spline 222 defines a plurality of hub teeth 224 that are configured for interlocking interference or abutting engagement with the shaft face spline 10 of the first rotatable shaft member 4.

The inner race body 220 of the inner race 200 of the bearing hub 16 includes an outer surface 230 that defines a plurality of circumferentially spaced, longitudinally extending ball tracks or grooves 232. The plurality of circumferentially spaced, longitudinally extending ball tracks or grooves 232 extend from the first end 217 towards the second end 218. The plurality of circumferentially spaced, longitudinally extending ball tracks or grooves 232 are proximately aligned with a plurality of circumferentially spaced, longitudinally extending ball tracks or grooves defined by an inner surface of the outer race The joining member 21 extends from the second end 218 of the inner race 200 of the bearing hub 16 through the hub bore 216 into the shaft bore 12 of the first rotatable shaft member 4. The joining member 21 fixes the inner race 200 of the bearing hub 16 to the first rotatable shaft member 4 with the hub face spline 222 and shaft face spline 10 engaged in interlocking engagement.

In at least one embodiment, the universal joint 1 or the constant velocity joint 2 is configured as a double cardan joint. In such a configuration, the bearing hub 16 may be at least one of an inner yoke or an outer yoke having an end defining the hub face spline 20. The joining member 21 extends through at least one of the inner yoke or the outer yoke and into the shaft bore 12 of the first rotatable shaft member 4. The joining member 21 fixes at least one of the inner yoke or the outer yoke of the bearing hub 16 to the first rotatable shaft member 4 with the hub face spline 20 and shaft face spline 10 engaged in interlocking engagement.

The inner yoke defines a laterally extending inner pin bore that extends along an axis that is disposed substantially transverse to the first longitudinal axis 6 and the second longitudinal axis 26. The outer yoke defines a laterally extending outer pin bore that extends along an axis that is disposed substantially transverse to the first longitudinal axis 6 and the second longitudinal axis 26.

Figure 11:
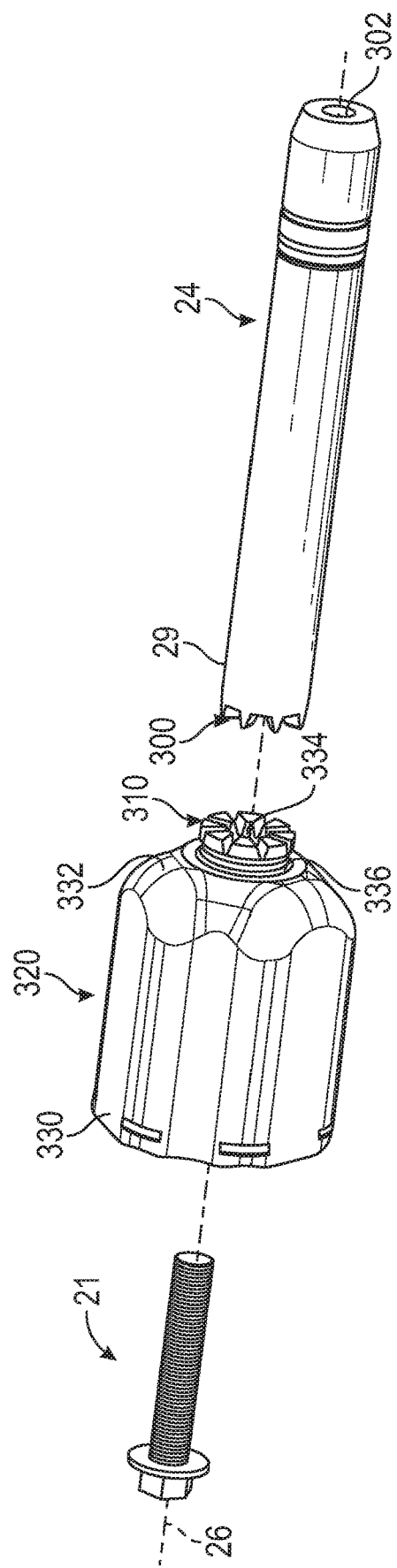
FIG. 11 is a disassembled view of a portion of the universal joint or constant velocity joint.

Referring to FIG. 11, the second rotatable shaft member 24 may be provided with a shaft face spline 300 at the joint end 29 and a longitudinally extending shaft bore 302 extending inwardly from the joint end 29. The shaft bore 302 may extending longitudinally completely through the second rotatable shaft member 24. The shaft bore 302 is a threaded shaft bore.

The shaft face spline 300 may have a substantially similar configuration as the shaft face spline 10 of the first rotatable shaft member 4, as previously discussed. The shaft face spline 300 is configured meshingly engage with a hub face spline 310 formed on a housing 320. The hub face spline 310 may have a substantially similar configuration as the hub face spline 20 of the bearing hub 16, as previously discussed.

The housing 320 defines a plurality of circumferentially spaced, longitudinally or axially extending ball tracks, guide grooves or guide channels extending along and parallel with the second longitudinal axis 26 of the second rotatable shaft member 24. The guide channels extend from an open end 330 of the housing 320 towards a closed end 332 of the housing 320.

The closed end 332 defines a longitudinally extending opening 334 that extends through a face 336 of the closed end 332 along the second longitudinal axis 26. The opening 334 is disposed concentrically with the respect to the guide channels 30.

The hub face spline 310 of the housing 320 may be defined by or extend from the face 336 of the closed end 332. The hub face spline 310 interlockingly engages the shaft face spline 300.

The joining member 21 extends from the closed end 332 of the housing 320 through the opening 334 along the second longitudinal axis 26 into the shaft bore 302 of the second rotatable shaft member 24. The joining member 21 fixes the housing 320 to the second rotatable shaft member 24 with the hub face spline 310 and shaft face spline 300 engaged in interlocking engagement, as previously described.

While the present disclosure has been described in detail in connection with only a limited number of embodiments, it should be readily understood that the present disclosure is not limited to such disclosed embodiments. Rather, the present disclosure may be modified to incorporate any number of variations, alterations, substitutions or equivalent arrangements not heretofore described, but which are commensurate with the scope of the present disclosure. Furthermore, various features or elements may be combined to create further embodiments of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A universal or constant velocity joint, comprising:
a first rotatable shaft member that extends along a longitudinal axis, the first rotatable shaft member having a free end and a shaft bore that longitudinally extends through the first rotatable shaft member, the free end defining a shaft face spline;
a bearing member, comprising:
a bearing hub having a first end, a second end, and a longitudinally extending hub bore extending between the first end and second end, the first end having a hub face spline;
a joining member that extends from the second end of the bearing hub through the hub bore into the shaft bore, fixing the bearing member to the first rotatable shaft member with the hub face spline and shaft face spline engaged in interlocking engagement; and
an outer rim face of the first end of the bearing hub, wherein the bearing hub teeth protrude axially away from the outer rim face from 4 mm to 20 mm;
wherein the shaft face spline and the hub face spline each include a respective plurality of shaft teeth and hub teeth, the shaft teeth and hub teeth disposed in an interference fit condition, wherein the plurality of hub teeth protrude from the hub face,
wherein each of the plurality of shaft teeth and the plurality of hub teeth have a shaft tooth flank, a shaft tooth tip, and a shaft tooth root, and wherein the shaft tooth flank of at least one tooth of the plurality of shaft teeth or at least one of the plurality of hub teeth is curved.

2. The joint of claim 1, wherein the shaft bore is a threaded shaft bore and the joining member comprises a threaded bolt that is threaded into the threaded shaft bore to provide a selectively attachable and detachable connection.

3. The joint of claim 1, wherein a number of at least one of the shaft teeth and the hub teeth is 2-80.

4. The joint of claim 1, wherein the bearing hub comprises a tripot spider.

5. The joint of claim 1, wherein at least one hub tooth has opposing hub tooth flanks that become progressively closer to each other in a direction that extends towards the longitudinal axis.

6. The joint of claim 1, wherein at least one shaft tooth has an outer portion that tapers inwardly toward the longitudinal axis in a direction that extends from a shaft tooth root towards a shaft tooth tip.

7. The joint of claim 1, wherein the plurality of shaft teeth has a height from a shaft tooth root to a shaft tooth tip of 1 mm to 20 mm.

8. The joint of claim 1, wherein the bearing hub comprises a cylindrical bearing hub.

9. The joint of claim 8, further comprising:
a second rotatable shaft member that extends along a second longitudinal axis, the second rotatable shaft member having a housing arranged to slidably receive the bearing hub.

10. The joint of claim 1, wherein the cylindrical bearing hub includes a plurality of radially extending trunnions.

11. The joint of claim 1, wherein the bearing hub comprises an inner race having an inner race body that extends between the first end and the second end, the inner race body being provided with an outer surface that defines a plurality of circumferentially spaced, longitudinally extending ball tracks.

12. The joint of claim 1, wherein the bearing hub comprises an inner race having an inner race body that extends between the first end and the second end, the hub face spline extends between the first end and the hub bore.

13. The joint of claim 12, wherein the hub face spline is disposed in a non-parallel and non-perpendicular relationship with the first longitudinal axis.

* * * * *